United States Patent [19]

Oat

[11] Patent Number: 4,962,006

[45] Date of Patent: Oct. 9, 1990

[54] METHOD OF COLORING CEMENT

[75] Inventor: Henry C. Oat, Santa Fe, N. Mex.

[73] Assignee: Color-Crete, Santa Fe, N. Mex.

[21] Appl. No.: 449,072

[22] Filed: Nov. 3, 1989

Related U.S. Application Data

[63] Continuation of Ser. No. 159,729, Feb. 24, 1988, abandoned, which is a continuation-in-part of Ser. No. 879,449, Jun. 27, 1986, abandoned.

[51] Int. Cl.$^5$ .......................... B32B 13/00; B03D 3/02
[52] U.S. Cl. .................................. 428/703; 427/372.2
[58] Field of Search .................... 427/736, 376.1, 737, 427/372.2, 427, 424, 419, 419.8; 106/101, 102; 428/689, 698, 703, 704

[56] References Cited

U.S. PATENT DOCUMENTS

| | | | |
|---|---|---|---|
| 834 | 3/1962 | Taylor | 106/101 |
| 1,200,645 | 10/1916 | Pelton | 106/101 |
| 1,829,082 | 10/1931 | Bergen et al. | 106/101 |
| 1,958,615 | 5/1934 | Finn | 106/101 |
| 3,068,109 | 12/1962 | Rodeffer | 106/98 |
| 3,799,785 | 3/1974 | Tanner | 106/101 |
| 4,572,739 | 2/1986 | Rasmussen | 106/101 |

FOREIGN PATENT DOCUMENTS 55144485 11/1980 Japan .................... 427/53.1

*Primary Examiner*—Stanley Silverman

[57] ABSTRACT

A method of coloring cement containing products includes applying a metal sulfate to the surface of the product in the presence of water.

13 Claims, No Drawings

METHOD OF COLORING CEMENT

BACKGROUND OF THE INVENTION

This is a continuation of copending application(s) Ser. No. 07/159,729 filed on Feb. 24, 1988, now abandoned, which is a continuation-in part of U.S. Ser. No. 879,449, filed June 27, 1986, now abandoned.

This invention relates to coloring cement.

Numerous methods have been employed to color cement-containing products formed of mortar and concrete to make the products appear to be formed of a natural stone. Many of these processes involve mixing of coloring materials with the cement, together with complex and expensive drying, heating, and grinding steps. Also, it is known that large proportions of mineral pigments are often required to produce the desired color in a hardened cement products, making the coloring process uneconomical.

SUMMARY OF THE INVENTION

The invention features a method of coloring the surface of a pre-formed cement containing product by applying a metal sulfate to a surface of the product in the presence of water, e.g., in the form of an aqueous solution. Ferrous sulfate, copper(II) sulfate, and manganese sulfate can be used in the method. The cement containing product can be cured or green (uncured), and can be, for example, mortar or concrete. The color achieved is relatively permanent and colorfast, and gives the product the natural appearance of stone.

It should be noted that the colorant applied to the cement article according to this invention is neither a stain nor is it a paint. In fact it is applied from an aqueous phase not from an organic chemical phase, as would be the case where a stain was used, nor is the colorant applied in conjunction with the laying down of a film, suitably an organic polymer film, on the cement article surface. It can generally be said that according to the process of this invention, the metal sulfate colorant is applied to the preformed cement article surface in the substantial absence of organic polymers or solvents or other organic phases which would cause partition of the metal sulfate out of an aqueous phase, which seems to be required for the practice of this invention.

The process provides an economical method of coloring cement containing materials such as stuccoed buildings and walls, concrete slabs and blocks, stamped concrete floors, concrete structures such as buildings and bridges. The economy provided by the process results at least in part from the recognition that only the surface of the product needs to be coated to obtain a durability of color. The coloring solution is inexpensive, easy to apply (e.g., by spraying, brushing, mopping or pouring onto the surface) under normal conditions (e.g., in the open air), and relatively non-toxic in the concentrations used. Also, any surface area damaged after the initial application of the coloring solution may be easily and conveniently re-colored.

Other features and advantages of the invention will be apparent from the Description of the Preferred Embodiment thereof, and from the claims.

DESCRIPTION OF THE PREFERRED EMBODIMENT

In the preferred method, an aqueous solution of the metal sulfate is applied to a surface of the cement containing product. The concentration preferably is between one-quarter ounce and four ounces of metal sulfate, dry-weight, per gallon of water; the concentration will determine the shade of color achieved. For example, low concentrations of ferrous sulfate will result in a yellowish tan surface, while high concentrations will give a reddish brown color.

Without being limited to a particular theory, it is felt that the wearability of the color imparted by the method results from a chemical reaction in which the sulfur in the sulfate acts as a bonding agent between the metal ion and the calcium carbonate in the cement, with water being the activating agent. For example, the reaction between ferrous sulfate and cement is thought to be as follows:

$$Fe^{+2}(Aq) + SO_4^{-2}(Aq) + CaCO_3(S) \longrightarrow$$

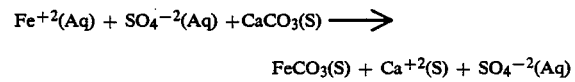

$$FeCO_3(S) + Ca^{+2}(S) + SO_4^{-2}(Aq)$$

As a result of the reaction, the ferrous ion, which is responsible for the color, is chemically bonded to and becomes an integral part of the cement. The color imparted will thus last as long as the surface of the cement.

The following examples are illustrative of the method.

EXAMPLE 1

One quarter ounce, dry weight, of anhydrous ferrous sulfate ($FeSO_4$) was mixed with one gallon of water. One coat of the resulting solution was applied to the surface of cement containing materials formed of mortar and concrete. Separate applications of the solution were made by spraying, brushing, mopping, and pouring the solution on the surface of the cement containing materials. The color imparted to the material was a naturally appearing light yellowish tan.

EXAMPLE 2

Four ounces, dry weight, of anhydrous ferrous sulfate ($FeSO_4$) was mixed with one gallon of water. One to four coats of the solution was applied to the surface of mortar and concrete materials in a manner similar to that described in Example 1. The color achieved was a deep reddish brown. Concentrations of ferrous sulfate above four ounces per gallon do not significantly enhance the coloring process.

EXAMPLE 3

The coloring solution prepared in Example 2 is mixed with a latex based drying inhibitor that is commonly used to slow down the drying time for mortar or concrete. When applied to wet or uncured mortar or concrete, a dark reddish brown color will result.

Copper(II) sulfate and manganese sulfate solutions have given similar results, with the copper(II) sulfate imparting a blue green color to the surface and the manganese sulfate a gray brown color.

Other embodiments are within the following claims.

I claim:

1. A method of coloring a surface of a preformed cement containing product, comprising
    applying a metal sulfate to said surface of said product in the presence of water, and
    permitting said metal sulfate to impart a permanent color to said surface under ambient conditions.

2. The method of claim 1 wherein said cement containing product is cured.

3. The method of claim 1 wherein said cement containing product is uncured.

4. The method of claim 1 wherein said cement containing product is a wall or floor of a building.

5. The method of claim 1 wherein said cement containing product is a drive or walkway.

6. The method of claim 1 wherein said cement containing product is concrete.

7. The method of claim 1 wherein said cement containing product is mortar.

8. The method of claim 1 wherein said sulfate is applied in the form of an aqueous solution comprising said sulfate.

9. The method of claim 8 wherein said solution has a concentration ranging from one-quarter ounce to four ounces, dry weight, of said sulfate per gallon of said solution.

10. The method of claim 1 wherein said sulfate is ferrous sulfate.

11. The method of claim 1 wherein said sulfate is copper(II) sulfate.

12. The method of claim 1 wherein said sulfate is manganese sulfate.

13. The product of the process of claim 1.

* * * * *